June 20, 1944.  R. E. MARBURY  2,351,989
SERIES CAPACITOR PROTECTION
Filed Aug. 26, 1942
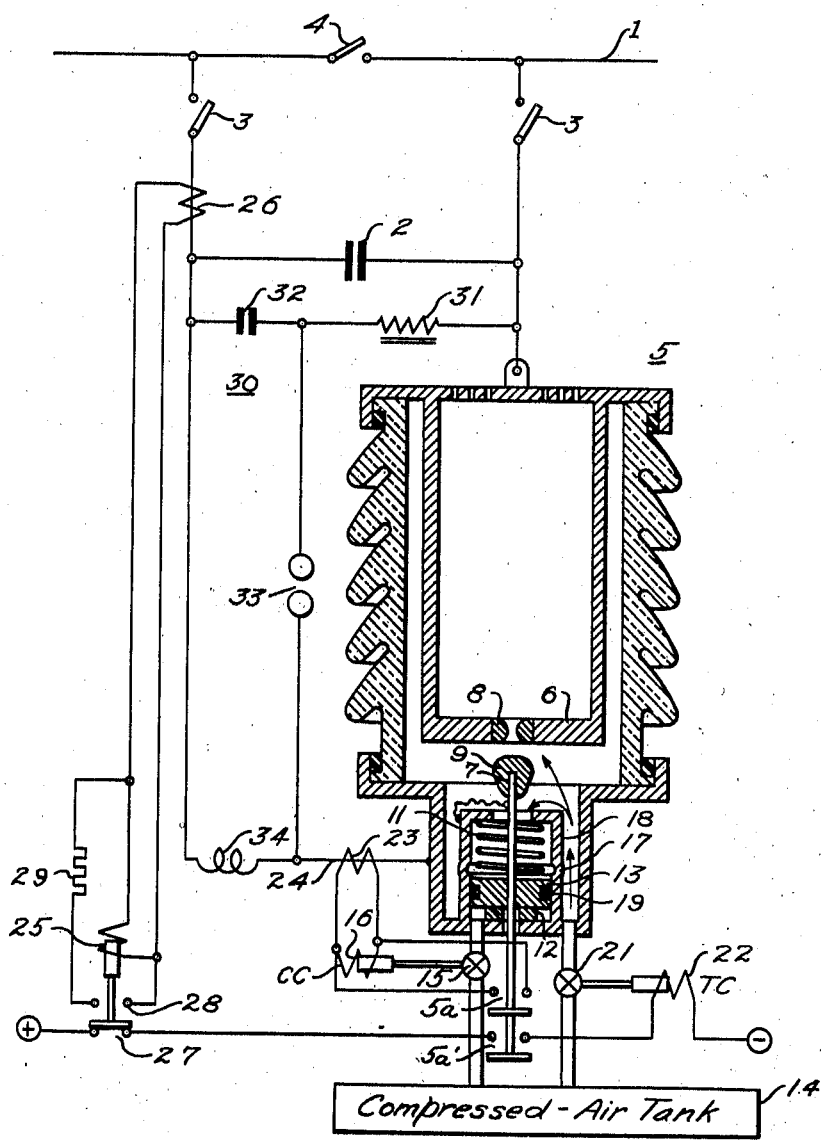
WITNESSES:
INVENTOR
Ralph E. Marbury.
BY
ATTORNEY Patented June 20, 1944

2,351,989

UNITED STATES PATENT OFFICE 2,351,989

SERIES CAPACITOR PROTECTION

Ralph E. Marbury, Wilkinsburg, Pa., assignor to Westinghouse Electric & Manufacturing Company, East Pittsburgh, Pa., a corporation of Pennsylvania Application August 26, 1942, Serial No. 456,208

16 Claims. (Cl. 175—294)

My invention relates to means for protecting series capacitors against overvoltages resulting from the flow of excessive line-currents therethrough, and it has particular relation to series capacitors for extending the power-limits of a multi-circuit high-voltage three-phase transmission line, in which it is essential, if the power-limits of the line are to be extended, for the capacitor to be quickly restored into service again after having been by-passed to protect it against excessive voltages during fault-current conditions.

Heretofore, many different means have been proposed and utilized for the protection of series capacitors. An early form of protection consisted of a gap-device connected in shunt around the capacitor, for arcing over in the event of an excessive voltage across the terminals of the capacitor, and some kind of contact-making device for by-passing the gap and thus extinguishing the arc in the gap, no particular means having been provided, in the early days, for properly effecting the quick reopening of the contact-making device for the purpose of restoring the capacitor into service within a time necessary for maintaining system-stability, in transmission-systems where stability is a limiting operating-condition.

Another old expedient for series-capacitor protection consisted in the suggested use of a movable-electrode gap-device, with a coil in series with the gap for pulling the gap-electrodes together against the bias of a spring, so that the gap-electrodes would promptly separate again, in response to an interruption of the line-current. Such a device is not feasible for operation in connection with series capacitors for multi-circuit transmission-lines under such conditions that the line-current is not completely interrupted upon the clearing of the fault, but merely returns to normal power-transmitting conditions, which may require a current-response so sensitive that a quick and positive capacitor-shunting operation is required when the current exceeds 115% of the normal power-current, and a quick and positive capacitor-restoring operation is required when the current is reduced to some value between 115% and 100%, which is far too close for the successful control of a current-responsive contactor in which the electromagnetic pull, tending to close the contacts, is continuously opposed by a spring or gravity.

More recently, as covered by an application of myself and others, Serial No. 445,562, filed June 3, 1942, a protected series-capacitor system was produced, utilizing quick-acting circuit-breakers for by-passing the protective gap-device and extinguishing the arc in the gap, and quick-acting tripping-means for getting the circuit-breaker open again in order to restore the series capacitor to service in time to be of some material benefit in connection with the stability or power-limits of the transmission-system. This capacitor-protecting means necessitated the utilization of a shunting gap-device, and a shunting circuit-breaker, or even a plurality of shunting circuit-breakers, for each capacitor.

Subsequently, as covered in an application of Ludwig and Fields, Serial No. 437,636, filed April 4, 1942, assigned to the Westinghouse Electric & Manufacturing Company, it was proposed to restore the capacitor to service more quickly than could be accomplished by closing and opening a circuit-breaker or a system of circuit-breakers, by normally not utilizing the shunting circuit-breaker at all, but employing, instead, a gas-blast for extinguishing the arc in the gap-device. This system still necessitated the use of shunting circuit-breakers, for back-up protection, and for use in removing the capacitor from service, in addition to the gap-device and its air-blast control.

Finally, prior to my present invention, as covered by an application of myself and others, Serial No. 446,740, filed June 12, 1942, an air-blast circuit-breaker was utilized, in its open position, as the gap-device, the air-blast being turned on for the purpose of extinguishing the arc when it became necessary to restore the capacitor to service, and the breaker never being closed except as an emergency-measure, or for removing the capacitor from service, so that the breaker was never closed and reopened again, in the normal service of the device, and yet the breaker was available for emergency use, as stated. This system suffered the disadvantage of excessive burning of the arcing contacts, if the time of arcing was at all prolonged, that is, if the fault-current condition endured for more than the briefest possible time-duration, on the transmission-system in question.

My present invention relates to the use of an air-type circuit-breaker in the open position, as the protective gap-device for a series capacitor, the arc across the gap being interrupted, not by an air-blast, but by a quick closing-operation of the breaker, and the capacitor being quickly restored to service, after the subsidence of the fault-current to normal current-values, by a quick breaker-opening operation. I preferably utilize a breaker of the air-blast type, but I can utilize any breaker having main contacts which operate in a gaseous medium, or which are at all times immersed in a gaseous medium, referring to "gaseous medium" in the sense of gas at any pressure, either atmospheric, higher-than-atmospheric, or lower-than-atmospheric pressure, down to the highest attainable vacuum, as contrasted with an essentially liquid medium, which generally has a high arc-suppressing characteristic. Preferably, also, the main contacts of the breaker are provided with arcing-contacts of a material having a low arc-drop, the breaker also preferably having a low arc-restriking voltage after each current-zero, and having the ability to withstand the play of the arc during the time necessary to effect a closure of the breaker. Preferably, also, the open breaker is utilized in combination with a trigger-gap means for controlling the breakdown-point of the protective gap-device in relation to the voltage appearing across the capacitor-terminals.

In this way, I avoid the drawback, of the constantly open air-blast breaker, in having to withstand the destructive effects of the play of the arc during the relatively long time necessary for the line-sectionalizing apparatus to clear the fault elsewhere on the transmission system, before it would be possible to turn on the air-blast to extinguish the arc; and by resorting to quick-acting breakers I am enabled to secure the necessary quick restoration of the series capacitor after the change from fault-conditions to normal power-conditions.

As compared with the old use of by-passing contactors having series current-coils to close the gap-electrodes and extinguish the arc, my present invention, by locking (or latching) the breaker closed, so that it no longer relies upon the continuance of fault-magnitude current to hold it closed, and by utilizing a separate detecting-means for sensitively selecting or determining the instant of time at which normal current-conditions have been restored, secures a positive tripping-impulse which may be, and is, utilized to produce a quick breaker-opening operation, as contrasted with the hesitating and slow contactor-opening operation which would necessarily be obtained when the opening-spring barely overcame the magnetic pull of the coil at a point where the two were just about equal.

As contrasted with the previous system of utilizing high-speed shunt-connected breakers for first closing, and thus interrupting the arc in a stationary-electrode gap-device, and then quickly opening, to restore the series capacitor to service after the subsidence of the fault-current, my present invention offers the advantage of saving one piece of equipment, namely, the main gap-device with stationary electrodes, this being accomplished by resorting to an air-type breaker, with the contacts normally open, with the same gap-separation which would normally be used for the stationary-electrode protective gap-device, the breaker-contacts being separated, not by the arc-suppressing oil which was previously utilized in the shunt-connected oil circuit-breakers, but by a gaseous medium which would permit the substantially unsuppressed play of the arc for the three cycles, more or less, needed to close the breaker, so that a low-voltage arc is obtained, having suitable characteristics for protecting the series capacitor against overvoltage and for preventing the sending out of voltage-transients over the transmission system.

With the foregoing and other objects in view, my invention consists in the apparatus, combinations, parts, systems and methods hereinafter described and claimed, and illustrated in the accompanying drawing, the single figure of which is a diagrammatic view of circuits and apparatus embodying my invention in its essentials, so far as the present invention is concerned, the air-blast breaker being indicated by a somewhat diagrammatic sectional view intended to be illustrative of its principles of operation.

In the drawing, I have represented the transmission system by a single line-conductor 1 which is intended to be a representative of a phase-conductor of an alternating-current transmission-system. I have shown a series capacitor 2, which is connected in series-circuit relation to the line-conductor 1, through suitable means, including two isolating disconnecting switches 3; a by-passing disconnecting switch 4 being also provided, in order to make it possible to remove the capacitor 2 from service.

In a preferred form of my invention, the series capacitor 2 is protected by means of a normally open, shunt-connected air-blast circuit-breaker 5, which may, however, be any suitable high-speed air-type breaker, as previously described. The breaker 5 is provided with stationary and movable contacts 6 and 7 respectively, having arcing contacts or tips 8 and 9 of a suitable arcing material, as previously described; a suitable material being a sintered mixture of tungsten and silver. The movable contact 7—9 is biased toward its open position by means of a heavy opening-spring 11, and the degree of opening is controlled by a suitable stop 12, so that the gap-separation between the stationary and movable contact-tips 8 and 9 is fixed at a predetermined value suitable for use as a protective gap-device for the series capacitor 2.

The circuit-breaker 5 is closed by means of air-pressure which is applied back of a piston 13 carried by the movable electrode-rod 7, the compressed air being supplied, from a tank 14, through an electrically controlled air-valve 15 which is diagrammatically indicated as being opened by means of a breaker-closing coil CC, also marked 16. When the breaker is closed, it is latched in its closed position by any suitable means such as an annular groove 17 in the piston-cylinder 18, adapted to be engaged by an expanding annular spring 19 in the piston 13; and the closing coil CC or 16 is deenergized, as by being short-circuited by an auxiliary breaker-switch 5a which closes when the breaker closes. The breaker thereupon remains closed, without continuous energization of the closing-coil CC, until a tripping or opening operation is initiated.

The breaker is opened by means of compressed air which is admitted, from the tank 14, to the top or front of the piston 13, by means of an electrically operated air-valve 21, which is illustrated as being opened by means of a trip-coil TC, also marked 22. When the trip-coil TC is energized, it admits air to the top of the piston 13, as indicated by the arrows, thereby creating sufficient pressure or force to break the lock at 17—19, and to force the piston downwardly, so as to open the breaker; and as soon as the breaker-contacts begin to part, compressed air also escapes through the center of the stationary contact-tip 8, as also indicated by the arrows, thus quickly extinguishing the arc. When the breaker opens, it remains open, with the compression-spring 11 forcing the piston 13 against the back-stop 12, and the trip-coil 22 is deenergized, by any suitable means such as an auxiliary breaker-switch 5a' which opens when the breaker opens.

It should be understood that the breaker 5 is of a quick-acting type, as previously mentioned, so that it is not only moderately quick in its closing-operation, but is also particularly quick in its opening-operation, so that it will restore the series capacitor 2 into service with as little delay as possible after the subsidence of the fault-current in the line-conductor 1.

The electrical control-means for initiating the closing and opening operations of the circuit-breaker 5 are of the simplest type. The closing-coil 16 is energized from the gap-current, through a current-transformer 23 which is connected in the circuit 24 which connects the breaker in shunt-circuit relation to the series capacitor 2. In this manner, as soon as the gap breaks down, between the two contact-tips 8 and 9 of the breaker, so that an arc-current flows through the breaker, the closing-coil 16 is energized, so as to initiate the closing-operation of the breaker.

The tripping time is controlled by means of an undercurrent relay 25 which is energized, in response to the line-current, through a current-transformer 26 in series with the series capacitor 2. The undercurrent relay 25 is provided with a back-contact 27 which is in series with a circuit for energizing the trip-coil 22 from a battery (+) and (−), through the auxiliary breaker-switch 5a'. The undercurrent relay 25 is preferably of a very sensitive type, which will pick up, and opens its back-contacts 27, in response to a very slight increase in the line-current above its normal value, the pickup-point of the relay being, for example, at about 115% of the normal line-current for power-transmitting purposes. It is essential, also, that the undercurrent relay 25 should drop out again, before the line-current drops to its 100% value, and in order to make the relay sufficiently sensitive to drop out at such a relatively high current-value, it is desensitized, by any suitable means, after it picks up, as by being provided with make-contacts 28 which are utilized to by-pass the relay-coil 25 through a shunting impedance 29.

In operation, therefore, a closing operation of my circuit breaker 5 is initiated in response to the gap-current, by the current-transformer 23 and the closing-coil 16. The breaker thereupon closes and locks itself closed, automatically deenergizing the closing-coil 16. In the meanwhile, the same overcurrent condition that produced a sufficiently excessive voltage to cause a breakdown, or arcing over, of the gap between the initially open breaker-contacts 8 and 9, caused an actuation of the undercurrent relay 25, which picks up and instantly opens its back-contact 27 in the tripping circuit of the breaker, so that, by the time that the breaker closes, thus closing its auxiliary tripping-switch 5a', the undercurrent contact 27 is opened so as to prevent an immediate breaker-opening operation. When the fault-current in the line 1 subsides to a predetermined value, which, in the illustrated case, would be between 115% and 100% of the normal line current, the undercurrent relay 25 quickly drops out, closing its back-contact 27 in the tripping circuit, and energizing the trip-coil 22, so as to give a prompt and positive and strong tripping-impulse which results in a fast breaker-opening operation.

The main capacitor 2, being connected across the terminals of the breaker, substantially prevents arcing when the breaker-contacts part, by diverting the line-current from the breaker, thus deenergizing the closing-coil 16 and preventing an immediate reclosing of the breaker, unless the breaker-gap 8—9 arcs over again, because of an overvoltage condition.

In the preferred form of embodiment of my invention, I rely upon the normal gap-separation between the stationary and movable contact-tips 8 and 9 of the breaker to have a breakdown-voltage corresponding to 300% of the normal capacitor-voltage, that is, the voltage which appears across the capacitor-terminals when the line-current is 300% of its normal full-load value. This produces a quick breakdown or arcing-over of the gap 8—9, the time-lag of which is not over one cycle, on a 60-cycle basis, thus limiting, to one cycle, the time during which the series capacitor 2 is required to withstand 300% of its rated voltage.

In order to more completely protect the series capacitor 2, I have also provided an inverse-time transient-delay trigger-gap device 30, which consists of a 60-cycle inductance 31 connected in series with an auxiliary capacitor 32 across the terminals of the main or series capacitor 2 which is to be protected. This produces a voltage across the auxiliary capacitor 32, which is two or three times higher than that which appears across the terminals of the main series capacitor 2, and this voltage is utilized to break down a pilot-gap 33 which is connected across the terminals of the auxiliary capacitor 32, through a high-frequency or air-core reactor 34 which is also in series-circuit relation to the shunt circuit 24 which connects the circuit-breaker 5 in shunt-circuit relation across the terminals of the main series capacitor 2.

The trigger-gap circuit 30 just described constitutes the subject-matter which is described and claimed in my application Serial No. 445,751, filed June 4, 1942, covering an apparatus for securing variable-time triggering of a main gap, such as the gap 8—9, the variable time being produced by the series arrangement of the auxiliary capacitor 32 and the inductance-coil 31, which causes the triggering-voltage to be built up slowly, only after a certain number of cycles of the 60-cycle line-current, this building-up operation being fast or slow according to the amount of overvoltage appearing across the terminals of the main series capacitor 2. As utilized in the illustrative embodiment of my invention, the triggering gap-device 30 is adjusted so as to produce an arcing-over or breaking-down of the main gap 8—9 within two cycles at a 200% overvoltage across the terminals of the main series capacitor 2, longer time-delays being provided when the amount of overvoltage is less than 200%.

I claim as my invention:

1. The combination, with an alternating-current line-conductor, of a series capacitor, a circuit-breaker having main contacts which are at all times immersed in a gaseous medium, means for connecting the series capacitor in series-circuit relation to the line-conductor, means for providing a capacitor-bypassing circuit including the open contacts of the breaker as a protecting gap-device for protecting the capacitor against overvoltages during fault-current conditions, means responsive to an arcing-over the open breaker-contacts for quickly closing the breaker and locking it closed, and means operative subsequently to the discontinuance of the fault-current conditions for quickly opening the breaker and locking it opened.

2. The combination, with an alternating-current line-conductor, of a series capacitor, a circuit-breaker having main contacts which are at all times immersed in a gaseous medium, means for connecting the series capacitor in series-circuit relation to the line-conductor, means for providing a capacitor-bypassing circuit including the open contacts of the breaker as a protecting gap-device for protecting the capacitor against overvoltages during fault-current conditions, means responsive to an arcing-over the open breaker-contacts for quickly closing the breaker and locking it closed, and means responsive to the subsidence of the line-current to the neighborhood of normal current-values for quickly opening the breaker and locking it opened.

3. The combination, with an alternating-current line-conductor, of a series capacitor, a gas-blast circuit-breaker, means for connecting the series capacitor in series-circuit relation to the line-conductor, means for providing a capacitor-bypassing circuit including the open contacts of the breaker as a protecting gap-device for protecting the capacitor against overvoltages during fault-current conditions, means responsive to an arcing-over of the open breaker-contacts for quickly closing the breaker and locking it closed, and means operative subsequently to the discontinuance of the fault-current conditions for quickly opening the breaker and locking it opened.

4. The combination, with an alternating-current line-conductor, of a series capacitor, a gas-blast circuit-breaker, means for connecting the series capacitor in series-circuit relation to the line-conductor, means for providing a capacitor-bypassing circuit including the open contacts of the breaker as a protecting gap-device for protecting the capacitor against overvoltages during fault-current conditions, means responsive to an arcing-over of the open breaker-contacts for quickly closing the breaker and locking it closed, and means responsive to the subsidence of the line-current to the neighborhood of normal current-values for quickly opening the breaker and locking it opened.

5. A circuit-breaker having main contacts which are at all times immersed in a gaseous medium, breaker-operating means including an electro-responsive opening-initiating means and an electro-responsive closing-initiating means, control-means comprising means responsive to current flowing through the main contacts of the breaker when said contacts are open for effecting the energization of the closing-initiating means, breaker-position-responsive means for discontinuing such energization when the breaker is closed, means operable at times, for effecting the energization of the opening-initiating means when the breaker is closed and for discontinuing such energization when the breaker is opened, and a capacitor connected across the main contacts of the breaker whereby the current previously passing through the main contacts is transferred substantially to the capacitor when the main contacts begin to part during the opening-operation of the breaker.

6. An air-blast circuit-breaker, having operating-means including an electro-responsive opening-initiating means and an electro-responsive closing-initiating means, control-means comprising means responsive to current flowing through the main contacts of the breaker when said contacts are open for effecting the energization of the closing-initiating means, breaker-position-responsive means for discontinuing such energization when the breaker is closed, means operable, at times, for effecting the energization of the opening-initiating means when the breaker is closed and for discontinuing such energization when the breaker is opened, and a capacitor connected across the main contacts of the breaker whereby the current previously passing through the main contacts is transferred substantially to the capacitor when the main contacts begin to part during the opening-operation of the breaker.

7. The invention as defined in claim 1, characterized by the main contacts of the breaker having arcing-contacts of a material having a low arc-drop, a low arc-restriking voltage after each current-zero, and the ability to withstand the play of the arc during the time necessary to effect a closure of the breaker.

8. The invention as defined in claim 2, characterized by the main contacts of the breaker having arcing-contacts of a material having a low arc-drop, a low arc-restriking voltage after each current-zero, and the ability to withstand the play of the arc during the time necessary to effect a closure of the breaker.

9. The invention as defined in claim 3, characterized by the main contacts of the breaker having arcing-contacts of a material having a low arc-drop, a low arc-restriking voltage after each current-zero, and the ability to withstand the play of the arc during the time necessary to effect a closure of the breaker.

10. The invention as defined in claim 4, characterized by the main contacts of the breaker having arcing-contacts of a material having a low arc-drop, a low arc-restriking voltage after each current-zero, and the ability to withstand the play of the arc during the time necessary to effect a closure of the breaker.

11. The invention as defined in claim 5, characterized by the main contacts of the breaker having arcing-contacts of a material having a low arc-drop, a low arc-restriking voltage after each current-zero, and the ability to withstand the play of the arc during the time necessary to effect a closure of the breaker.

12. The invention as defined in claim 6, characterized by the main contacts of the breaker having arcing-contacts of a material having a low arc-drop, a low arc-restriking voltage after each current-zero, and the ability to withstand the play of the arc during the time necessary to effect a closure of the breaker.

13. The invention as defined in claim 1, in combination with trigger-gap means for controlling the breakdown-point of the protecting gap-device in relation to the voltage appearing across the capacitor-terminals.

14. The invention as defined in claim 2, in combination with trigger-gap means for controlling the breakdown-point of the protecting gap-device in relation to the voltage appearing across the capacitor-terminals.

15. The invention as defined in claim 3, in combination with trigger-gap means for controlling the breakdown-point of the protecting gap-device in relation to the voltage appearing across the capacitor-terminals.

16. The invention as defined in claim 4, in combination with trigger-gap means for controlling the breakdown-point of the protecting gap-device in relation to the voltage appearing across the capacitor-terminals.

RALPH E. MARBURY.